United States Patent
Tsuji (10) Patent No.: US 8,779,706 B2
(45) Date of Patent: Jul. 15, 2014

(54) CONTROL APPARATUS FOR ROTARY ELECTRIC MACHINES

(75) Inventor: Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 45 days.

(21) Appl. No.: 13/234,468

(22) Filed: Sep. 16, 2011

(65) Prior Publication Data

US 2012/0068644 A1 Mar. 22, 2012

(30) Foreign Application Priority Data

Sep. 17, 2010 (JP) ................................. 2010-208767

(51) Int. Cl.
  *H02H 7/08* (2006.01)
(52) U.S. Cl.
  USPC ................ 318/400.21; 318/400.2; 318/254.1; 318/245; 318/139; 318/434
(58) Field of Classification Search
  USPC .............. 318/400.21, 400.2, 254.1, 245, 139, 318/400.22, 434
  See application file for complete search history.

(56) References Cited

U.S. PATENT DOCUMENTS

| | | | | |
|---|---|---|---|---|
| 5,677,611 | A | * | 10/1997 | Yoshihara et al. ............. 318/803 |
| 5,694,010 | A | * | 12/1997 | Oomura et al. .......... 318/400.07 |
| 5,708,576 | A | * | 1/1998 | Jones et al. ................. 363/56.03 |
| 2007/0249461 | A1 | | 10/2007 | Tsuji et al. |
| 2009/0195199 | A1 | | 8/2009 | Ito |
| 2010/0253267 | A1 | | 10/2010 | Kitanaka |

FOREIGN PATENT DOCUMENTS

| | | |
|---|---|---|
| CN | 101507092 A | 8/2009 |
| JP | 2007-312588 | 11/2007 |
| JP | 2007-318849 | * 12/2007 |
| JP | P2007-318849 A | 12/2007 |
| JP | P2008-054420 A | 3/2008 |
| JP | 4252109 | 1/2009 |
| JP | P2010-035339 A | 2/2010 |

OTHER PUBLICATIONS

Office Action (7 pgs.) dated Sep. 4, 2013 issued in corresponding Chinese Application No. 201110282074.5 with an at least partial English-language translation thereof (9 pgs.).
Japanese Office Action dated Jul. 17, 2012, issued in corresponding Japanese Application No. 2010-208767 with English translation.

* cited by examiner

*Primary Examiner* — Eduardo Colon Santana
*Assistant Examiner* — Iftekhar Mustafa
(74) *Attorney, Agent, or Firm* — Nixon & Vanderhye PC (57) ABSTRACT

A control apparatus for a rotary electric machine has a DC-AC converting circuit with high- and low-potential-side switching elements to compose an inverter. In this apparatus, a connecting/disconnecting circuit is arranged to be electrically opened and closed between the DC-AC converting circuit and a power supply. A determining member determines whether or not the high-potential-side and low-potential-side switching elements have a malfunction. A failsafe performing element opens the connecting/disconnecting circuit and turns on both the high-potential-side and low-potential-side switching elements residing in a part of the inverter, when it is determined that there is caused a malfunction in the switching elements. The turned-on high-potential-side and low-potential-side switching elements realizes a short-circuit state therein.

13 Claims, 7 Drawing Sheets

FIG.6C

CONTROL APPARATUS FOR ROTARY ELECTRIC MACHINES

CROSS-REFERENCE TO RELATED APPLICATION

This application is based on and claims the benefit of priority from earlier Japanese Patent Application No. 2010-208767 filed Sep. 17, 2010 the description of which is incorporated herein by reference.

BACKGROUND OF THE INVENTION

1. Technical Field of the Invention

The present invention relates to a control apparatus for rotary electric machines, and in particular to the control apparatus equipped with a DC-AC converter having switching elements to control power from a DC power supply to a rotary electric machine.

2. Background Art

This type of control apparatus is well known. For example, a patent document JP-A-2007-312588 discloses a control apparatus which is able to turn on the arms on one side for all of the phases, including the arm having a short-circuited switching element. Thus, the peak of current can be suppressed in each of the phases of an electric motor.

In the control apparatus disclosed in the above patent document, a failsafe process is performed to suppress the peak of current in each of the phases of the electric motor. In performing the failsafe process, it is required to drive switching elements of the arms on one side for all of the phases. Accordingly, the electric power consumed in the failsafe process tends to be large.

SUMMARY

Hence it is desired to provide a scheme for coping with a short-circuit failure that has occurred in a switching element of a DC-AC converting circuit which is configured by serially connected bodies of high-potential-side switching elements and low-potential-side switching elements to selectively connect terminals of a rotary electric machine to the positive and negative output terminals of a DC power supply.

As an exemplary embodiment, there is provided a control apparatus for a rotary electric machine with terminals receiving power from a DC power supply with positive and negative output terminals, comprising: a DC-AC converting circuit provided with serially connected circuits each having a high-potential-side switching element and a low-potential-side switching element, the high-potential-side and low-potential-side switching elements selectively connecting the terminals of the rotary electric machine to the positive and negative output terminals of the power supply for controlling a controlled variable of the rotary electric machine; a connecting/disconnecting circuit arranged to be electrically opened and closed between the DC-AC converting circuit and the power supply to electrically connect and disconnect an electric path connecting both the DC-AC converting circuit and the power supply; determining means that determines whether or not the high-potential-side and low-potential-side switching elements have a malfunction; and failsafe performing means that opens the connecting/disconnecting circuit and turns on both the high-potential-side and low-potential-side switching elements residing in a part of the serially connected circuits when it is determined by the determining means that the high-potential-side and low-potential-side switching elements have the malfunction such that the turned-on high-potential-side and low-potential-side switching elements realize a short-circuit state therein.

In the case where a switching element has a short-circuit failure, if all the switching elements configuring the DC-AC converting circuit are turned off, the currents passing through the terminals of the rotary electric machine are likely to be deviated from a zero point and to be asymmetrical. In addition, the peak of each of the currents may become large to deteriorate the reliability of the switching elements having no short-circuit failure and further deteriorate the reliability of the rotary electric machine. In this regard, when a failsafe process for a short-circuiting malfunction is performed by turning on both of the high-potential-side switching elements and the low-potential-side switching elements of a part of the serially connected bodies, the deviation from the zero point is reduced and the peak is also made small. The failsafe performing means of the present embodiment has been configured in view of this matter.

It is preferred that the control apparatus has estimating means that estimates, among the switching elements, a switching element which has caused the malfunction therein, wherein the failsafe performing means includes means for turning on a switching element electrically connected in series to the switching element estimated by the estimating means.

In the exemplary embodiment, both of the high-potential-side switching elements and the low-potential-side switching elements can be turned on by electronically turning on only one of the high and low-potential-side switching elements.

Preferably, the failsafe performing means includes means for turning on both the high-potential-side and low-potential-side switching elements which compose only one of the serially connected circuits, the one serially connected circuit being short-circuited.

Still preferably, the rotary electric machine is mounted on a vehicle provided with the rotary electric machine, a main machine, a low-voltage power supply whose output voltage is lower than output voltage of the DC power supply, and a step-down converter which steps down the output voltage of the DC power supply and supplies the step-down voltage to the low-voltage power supply, the switching elements of the DC-AC converting circuit being turned on and off based on power from the low-voltage power supply and the main machine being controlled based on the power from the low-voltage power supply; and the step-down converter is electrically connected to the DC power supply via the connecting/disconnecting circuit, In the exemplary embodiment, the period of time when a limp-home running can be performed by the second main machine depends on the remaining capacity of the low-voltage power supply. The remaining capacity cannot be increased while the failsafe performing means is activated. Thus, it is particularly desired that the electric power consumed by the failsafe performing means is reduced,

DETAILED DESCRIPTION OF THE PREFERRED EMBODIMENTS

With reference to the accompanying drawings, hereinafter are described embodiments of the present embodiment.

Referring first to FIGS. 1 to 5, a first embodiment of the control according to the present invention is described. In the first embodiment, a control apparatus for a rotary electric machine of the present invention is applied to a parallel hybrid vehicle.

Figure 1:
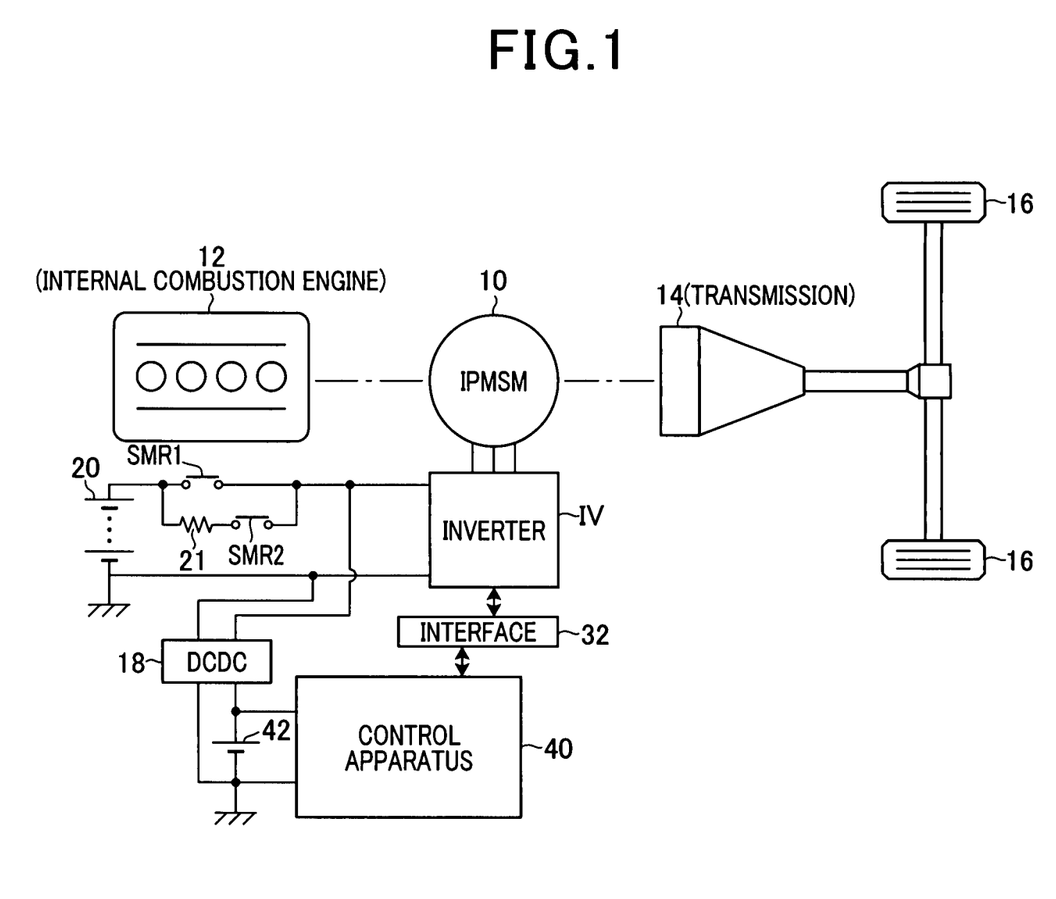
FIG. 1 is a schematic diagram generally illustrating a control system of an electric motor, according to a first embodiment of the present invention.

FIG. 1 is a schematic diagram generally illustrating a control system of an electric motor, according to the first embodiment. As shown in FIG. 1, the control system includes a motor-generator 10 (i.e., a first main machine or a first main engine), an internal combustion engine 12 (i.e., a second main machine or a second main engine), a transmission 14, a DC-DC converter 18, drive wheels 16, a high-voltage battery 20 (DC power supply) with positive and negative output terminals, an inverter IV (DC-AC converting circuit), a control apparatus 40 and a low-voltage battery 42.

The motor-generator 10 is a three-phase permanent magnet synchronous rotary electric machine. Also, the motor-generator 10 is a rotary electric machine having saliency (a salient pole machine). To be more precise, the motor-generator 10 is an interior permanent magnet synchronous motor (IPMSM). The motor-generator 10 has an output shaft directly and coaxially connected to an output shaft (crank shaft) of the internal combustion engine 12. Accordingly, the output shaft of the motor-generator 10 and the crank shaft of the internal combustion engine 12 rotate in a coaxial and integral manner, instead of rotating in a mutually relative manner. The output shaft of the motor-generator 10 is connected to the drive wheels 16 via the transmission 14.

The motor-generator 10 is connected to the inverter IV. The inverter IV converts DC voltage of the high-voltage battery 20 into AC voltage for the application to the motor-generator 10. Between the inverter IV and the high-voltage battery 20, a relay SMR2, a resistor 21 and a relay SMR1 are connected. Specifically, a serially connected circuit of the relay SMR2 and the resistor 21 is parallel-connected to the relay SMR1 to provide a parallelly connected circuit as a whole. The parallelly connected circuit is connected between the inverter IV and the positive output terminal of the high-voltage battery 20. The negative output terminal of the battery 20 is grounded. The output side of the parallelly connected circuit is electrically connected with the low-voltage battery 42 via the DC-DC converter 18, as shown in FIGS. 1 and 2.

On the other hand, the control apparatus 40 has the motor-generator 10 as an object to be controlled and the inverter IV as an object to be operated. The control apparatus 40 retrieves the outputs or the like of various sensors (not shown) for detecting state quantities to operate the inverter IV based on the retrieved outputs and to thereby control the controlled variable of the motor-generator 10. The control apparatus 40 uses the low-voltage battery 42 as its power source. The low-voltage battery 42 has a terminal voltage lower (e.g. more than 10 V) than the terminal voltage of the high-voltage battery 20 (more than 100 V).

In the present embodiment, the low-voltage battery 42 uses only the high-voltage battery 20 as a charging means. In other words, the voltage of the high-voltage battery 20 is stepped down by the DC-DC converter 18 and applied to the low-voltage battery 42 to charge the low-voltage battery 42.

Figure 2:
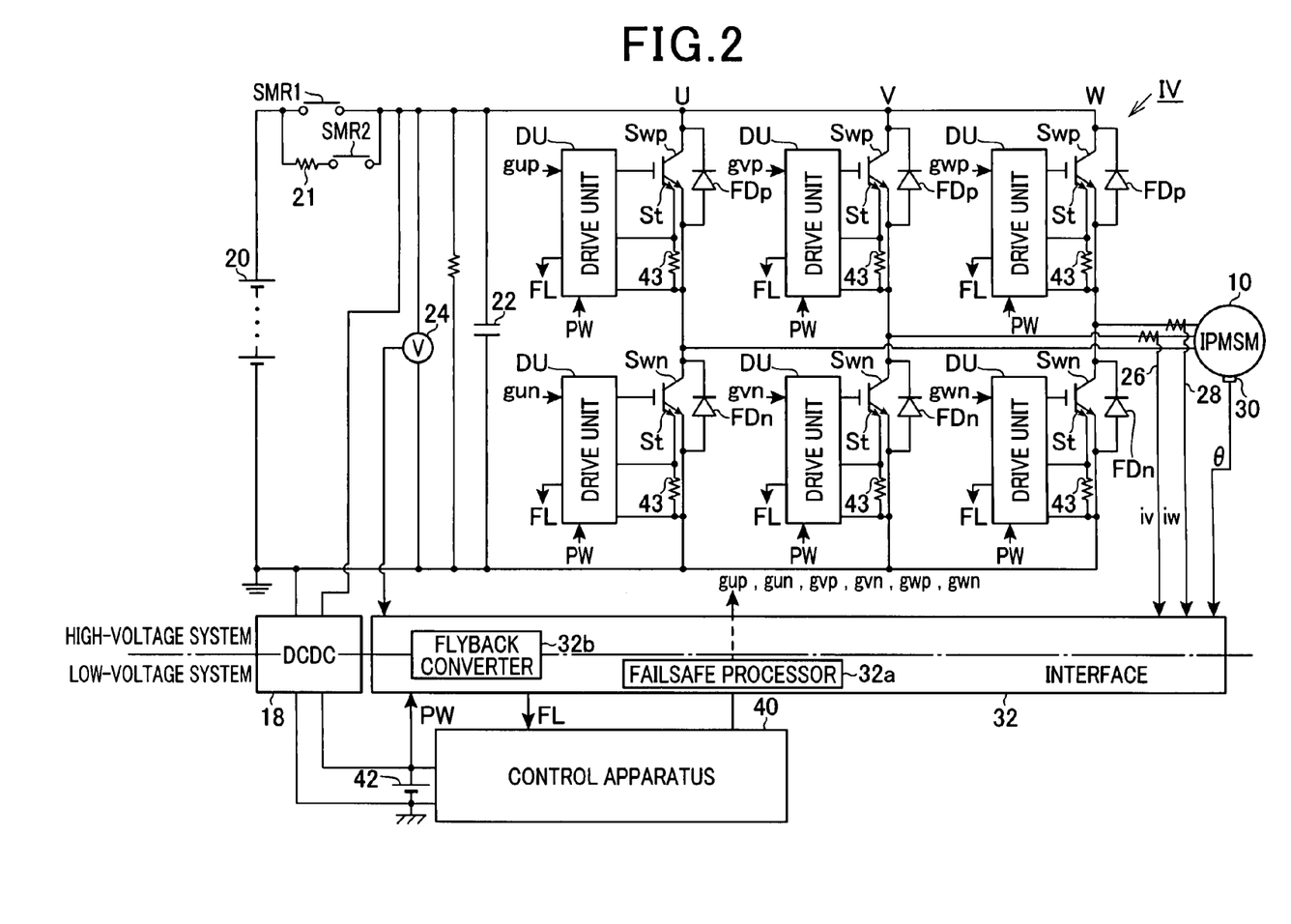
FIG. 2 is a schematic diagram illustrating electronic devices provided between an inverter and a control apparatus in the control system.

FIG. 2 is a schematic diagram illustrating electronic devices provided between the inverter IV and the control apparatus 40 in the control system.

The inverter IV is configured by three high-potential-side switching elements Swp and three low-potential-side switching elements Swn. Specifically, the three high-potential-side switching elements Swp are serially connected to the respective three low-potential-side switching elements Swn to provide three serially connected bodies. The three serially connected bodies are connected in parallel to configure the inverter IV. The connecting points between the high-potential-side switching elements Swp and the respective low-potential-side switching elements Swn are connected to the respective phases of the motor-generator 10.

Each of the high-potential-side switching elements Swp has input and output terminals (collector and emitter), with a high-potential-side freewheeling diode FDp being connected across the terminals. In the connection across the terminals, the cathode and the anode of the freewheeling diode FDp are connected to the collector and the emitter, respectively, of the switching element Swp. Similarly, each of the low-potential-side switching elements Swn has input and output terminals (collector and emitter), with a low-potential-side freewheeling diode FDn being connected across the terminals. In the connection across the terminals, the cathode and the anode of the freewheeling diode FDn are connected to the collector and the emitter, respectively, of the switching element Swn.

Each of the switching elements Swp and Swn is made up of an insulated gate bipolar transistor (IGBT). Also, each of the switching elements Swp and Swn is provided with a sense terminal St for outputting minute current which is correlated to the current passing across the input and output terminals of the switching element.

The minute current outputted by the sense terminal St passes through a shunt resistor 43 to step down the voltage. The amount of voltage drop is retrieved by a drive unit DU which is connected to a conduction control terminal (gate) of the switching element Sw# (#=p or n) to drive the Sw#. The drive unit DU uses the amount of voltage drop in the shunt resistor 43 to make a determination on the current passing across the input and output terminals of the switching element Sw#. If the current passing across the terminals is determined to be not less than a threshold current Ith, the drive unit DU exerts a function of forcibly turning off the switching element Sw#. The drive unit DU, when forcibly turning off the switching element Sw#, outputs a fail signal FL.

On the other hand, the control apparatus 40 retrieves detection values from various sensors, such as a voltage sensor 24 that detects the voltage across the input and output terminals of the inverter IV (the voltage of a capacitor 22), current sensors 26 and 28 that detect currents of V- and W-phases, respectively, of the motor-generator 10, and a rotation angle sensor 30 that detects the electrical angle of the motor-generator 10.

The control apparatus 40 uses the detection values of these various sensors to generate and output operation signals for the U-, V- and W-phases of the inverter IV. Specifically, the control apparatus 40 outputs operation signals gup, gvp and gwp for operating the switching elements Swp of the U-, V- and W-phases, respectively, and operation signals gun, gvn and gwn for operating the switching elements Swn of the U-, V- and W-phases, respectively, Thus, the switching elements Swp and Swn are operated by the control apparatus 40 via the drive units DU which are connected to the conduction control terminals (gates) of the respective switching elements Swp and Swn.

A high-voltage system including the inverter IV and a low-voltage system including the control apparatus 40 are insulated from each other by an interface 32 having an insulating means such as a photocoupler, not shown. The operation signals g*# (*=u, v or w; #=p or n) are outputted to the high-voltage system via the interface 32.

The interface 32 basically insulates between the low-voltage system and the high-voltage system. In the meantime, the interface 32 has a primary side that further includes a failsafe processor 32a. The failsafe processor 32a shuts down the inverter IV when a fail signal FL is outputted from a drive unit DU. The failsafe processor 32a may have the circuit configuration for shutting out an inverter as disclosed such as in JP-A-2009-060358.

The interface 32 further includes a flyback converter 32b. The flyback converter 32b serves as an insulated converter that supplies electric power of the low-voltage battery 42 to the drive units DU.

The switching element Sw# may be situated that the current flowing through the switching element Sw# exceeds the threshold current Ith. This situation chiefly occurs in the occurrence of a short-circuit failure in the switching element Sw#, in which the switching element Sw# is brought into a constantly conducted state irrespective of an electrical operation given to the switching element Sw#. The mechanism of the occurrence of this excessive current flow is that, when the switching element having a short-circuit failure and a switching element serially connected thereto are turned on, a current excessively flows through this pair of switching elements Swp and Swn. In the following description, a process of remedying such a short-circuit failure of the switching elements Swp and Swn is explained.

Figure 3A:
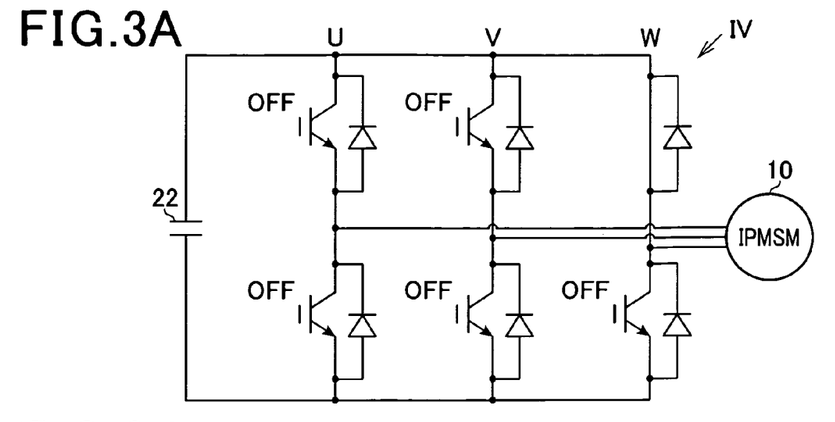
FIGS. 3A to 3C are diagrams indicating problems caused by a short-circuit failure.
Figure 3B:
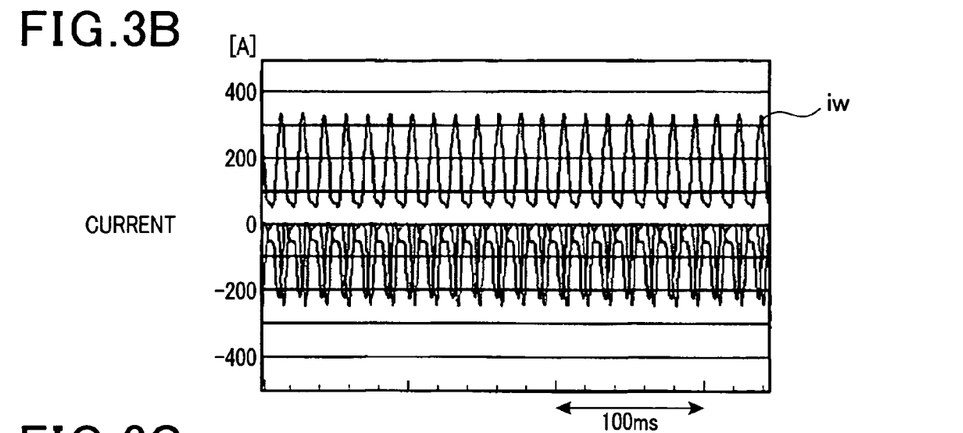
Figure 3C:
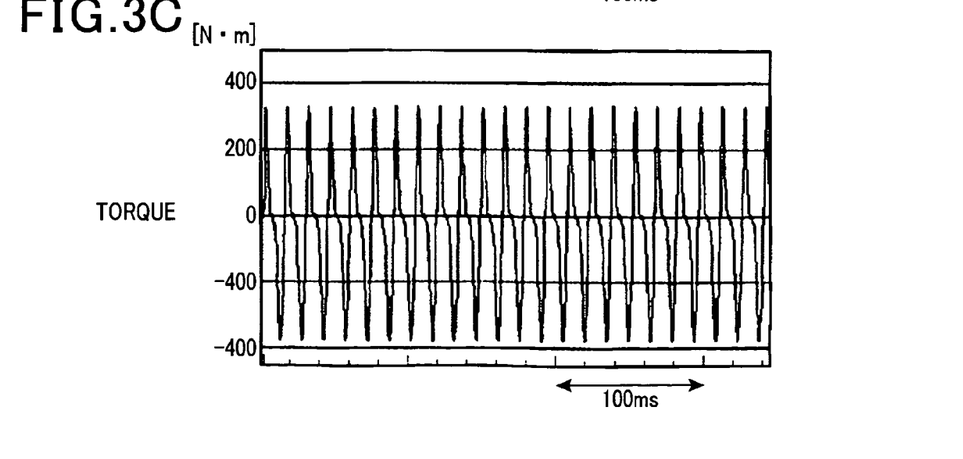
Figure 4A:
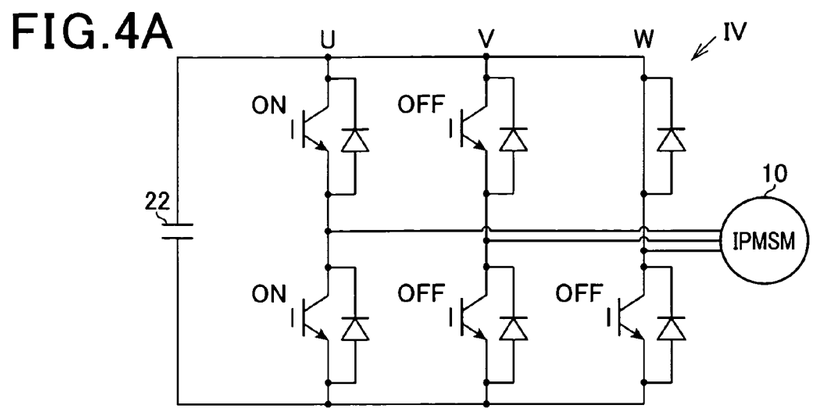
FIGS. 4A to 4C are diagrams explaining the principle of a failsafe process for malfunctions according to the first embodiment.
Figure 4B:
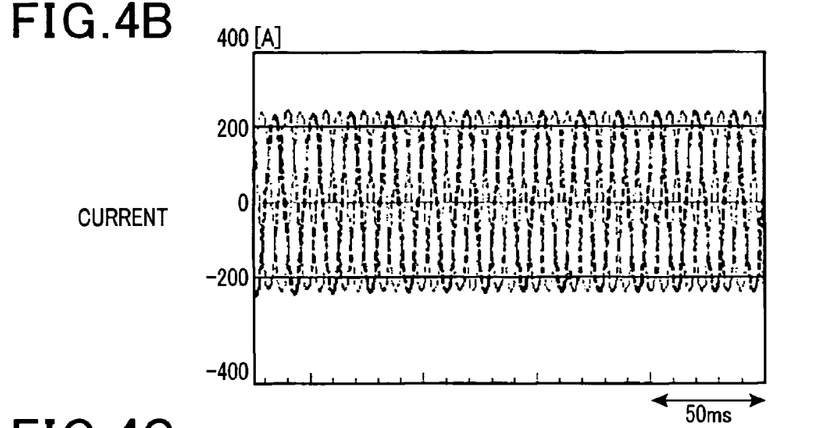
Figure 4C:
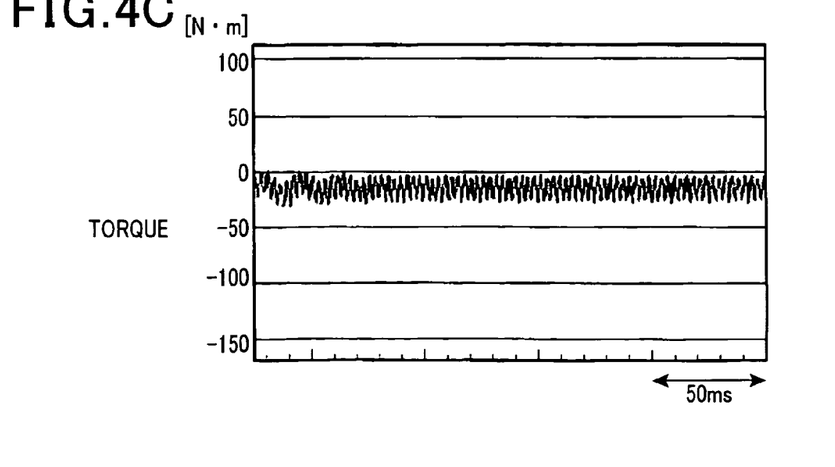

FIG. 3A illustrates an equivalent circuit in which a short-circuit failure has occurred in the W-phase upper-arm switching element Swp and thus all the other switching elements Swp and Swn have been turned off. FIG. 3B illustrates the behavior of the currents in the three phases in the state shown in FIG. 3A. FIG. 3C illustrates torque behavior. FIGS. 4A to 4C are diagrams explaining the principle of a failsafe process for malfunctions according to the first embodiment.

As shown in FIG. 3B, the amplitude centers of the currents of the three phases are deviated from zero and thus the maximum of the absolute value of each current becomes large. For this reason, the amount of generated heat is increased in the path of each current, tending to deteriorate the reliability such as of the inverter IV and the motor-generator 10.

In this regard, in the present embodiment, the relays SMR1 and SMR2 are opened and, as shown in FIG. 4A, the upper and lower arms of one of the phases, phase U, for example, of the inverter IV are turned on. Thus, as shown in FIG. 4B, the amplitude centers of the currents of the three phases are prevented from being deviated from zero to thereby make small the maximum of the absolute value of each current. In this case, torque is also reduced and thus limp-home running using the internal combustion engine 12 will not be prevented.

Figure 5:
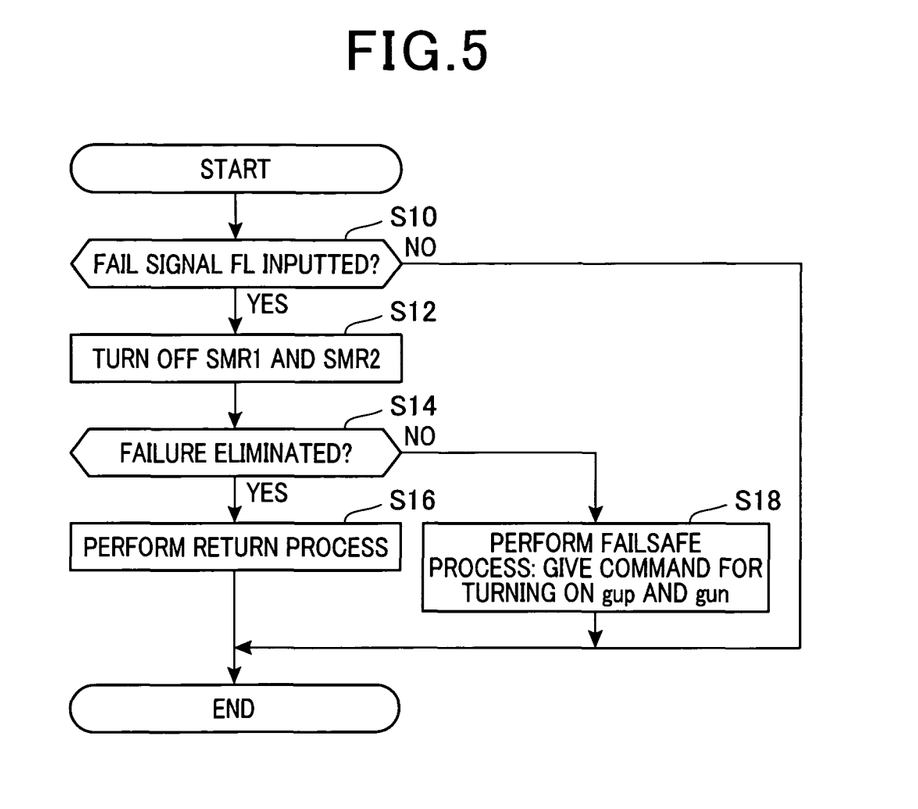
FIG. 5 is a flow diagram illustrating the failsafe process for malfunctions according to the first embodiment.

FIG. 5 shows a failsafe process for malfunctions according to the present embodiment. This process is repeatedly performed at a predetermined cycle, for example, by the control apparatus 40.

In a series of steps of the process, it is determined, at step S10, first, whether or not a fail signal FL is outputted from a drive unit DU. If a fail signal FL is outputted, the relays SMR1 and SMR2 are turned off. It should be appreciated that, when the motor-generator 10 is in operation, the relay SMR1 is usually in an on-state while the relay SMR2 is in an off-state, and accordingly, practically, only the relay SMR1 may have to be turned off. At the subsequent step S14, it is determined whether or not the failure has been eliminated. At this step, the failure may be determined to be eliminated when, for example, the amplitude centers of the currents passing through the motor-generator 10 are not deviated to a large extent from zero. If the failure is determined to be eliminated, control proceeds to step S16 where a return process is performed. In other words, for example, the relay SMR2 is turned on to charge the capacitor 22, followed by turning on the relay SMR1. Then, the inverter IV is operated to start controlling the controlled variable of the motor-generator 10.

On the other hand, if a negative determination is made at step S14, control proceeds to step S18 where the failsafe process is performed. At step S18, the operation signals gup and gun are used as on-operation commands to short-circuit the upper and lower arms of phase U.

When steps S16 and S18 are completed, or if a negative determination is made at step S10, the series of steps is temporarily ended.

As described above, in the present embodiment, a failsafe process is easily carried out when a short-circuit failure occurs, without specifying the part in which the failure occurs. Moreover, in this case, the number of switching elements turned on is two. Accordingly, power consumption of the low-voltage battery 42 is decreased and in addition the distance through which the vehicle can go into a limp-home mode is increased.

To be more precise, the drive units UD are activated by the electric power of the low-voltage battery 42 via the flyback converter 42b. For this reason, as the number of switching elements Sw# to be turned on is increased, the electric power consumed by the drive units DU tends to be increased. Meanwhile, when the relays SMR1 and SM42 are turned off, the low-voltage battery 42 cannot be charged any more via the DC-DC converter 18. Accordingly, the distance through which the vehicle can go into a limp-home mode depends on the remaining capacity of the low-voltage battery 42. Thus, in order to increase the distance of limp-home running, the power consumption of the low-voltage battery 42 is required to be decreased.

According to the embodiment specifically described above, the following advantages are obtained.

(1) When a switching element Sw# is determined to have a short-circuit failure, the relays SMR1 and SM42 are turned off and the upper and lower arms of one of the phases are short-circuited. Thus, the absolute value of the current flowing through the motor-generator 10 is decreased.

(2) The low-voltage battery 42 uses only the DC-DC converter 18 as a charging means. In this case, the number of parts is reduced compared with the case where an alternator is separately provided to generate electricity based on the motive power of the internal combustion engine 12. On the other hand, however, the distance of limp-home running is limited by, or depends on, the remaining capacity of the low-voltage battery 42. Thus, it is desired in particular that power consumption is reduced in performing a failsafe process. In this regard, the failsafe process described above is very useful.

[Second Embodiment]

Figure 6A:
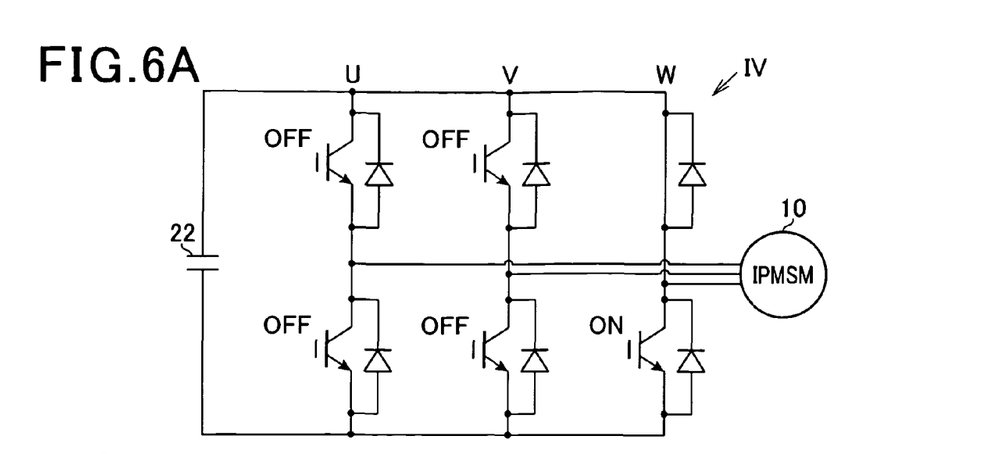
FIGS. 6A to 6C are diagrams illustrating the principle of a failsafe process according to a second embodiment of the present invention.
Figure 6B:
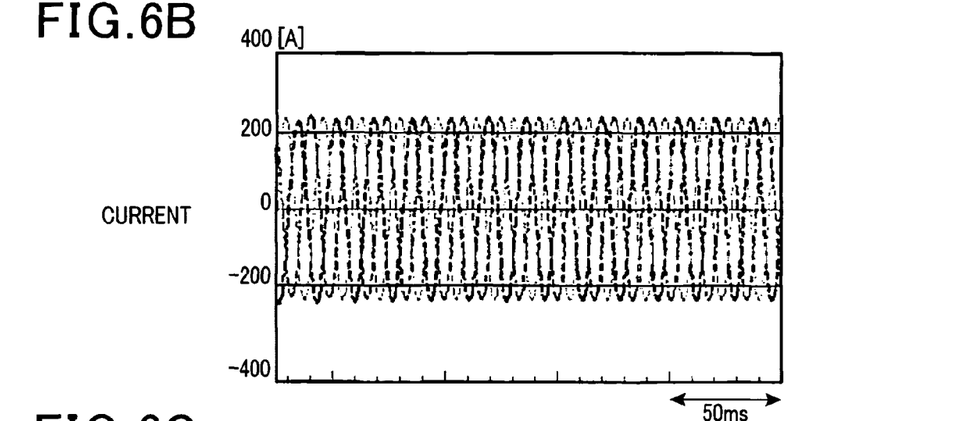
Figure 6C:
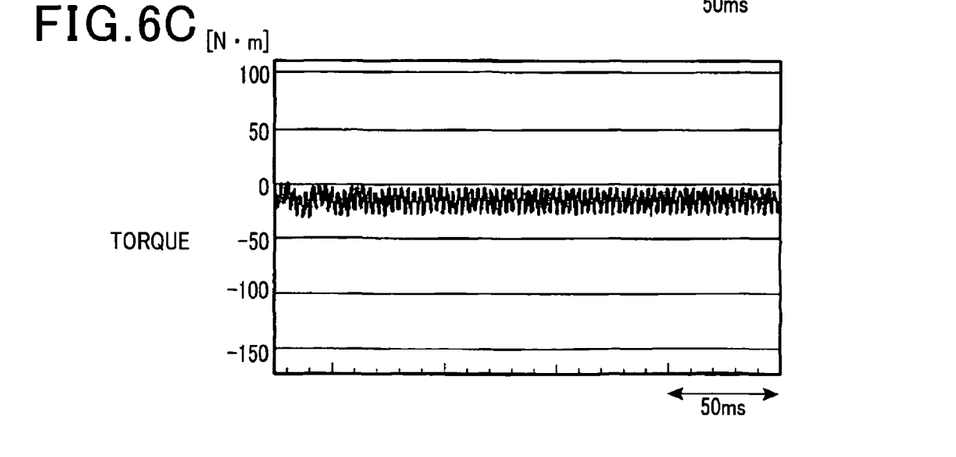
Figure 7:
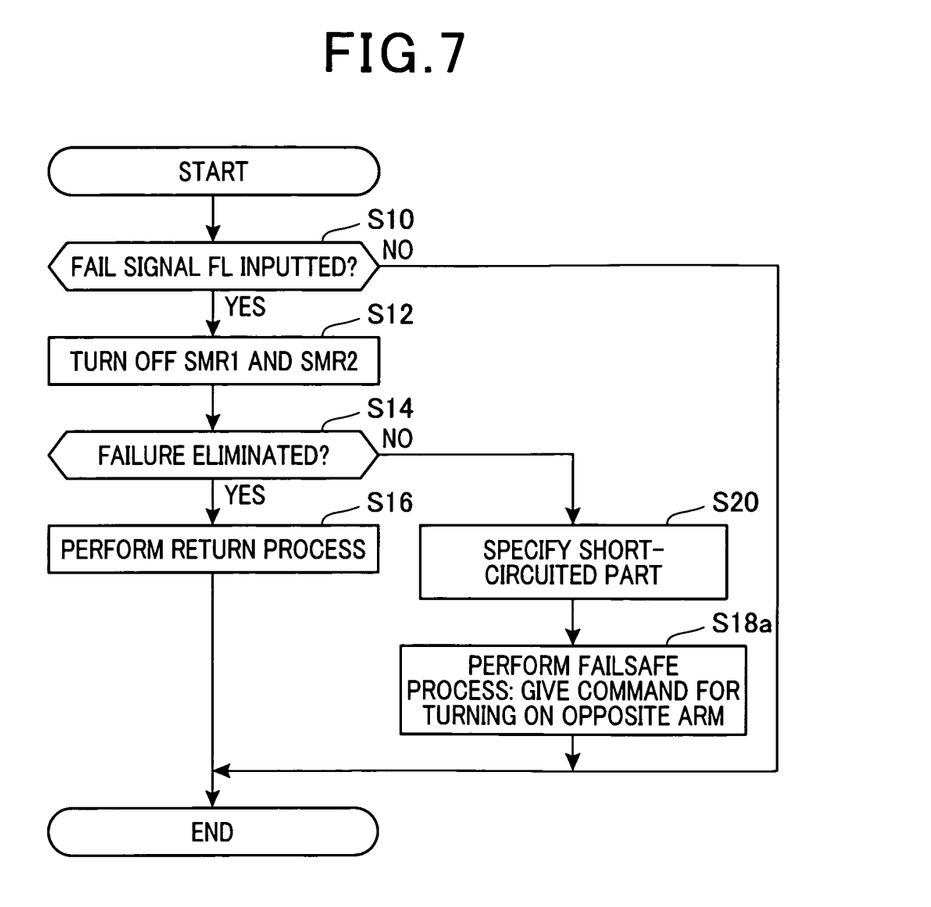
FIG. 7 is a flow diagram illustrating the failsafe process for malfunctions according to the second embodiment.

Referring now to FIGS. 6 and 7, hereinafter is described a second embodiment of the present invention, focusing on the differences from the first embodiment. In the second embodiment, the components identical with or similar to those in the first embodiment are given the same reference numerals for the sake of omitting unnecessary explanation.

FIGS. 6A to 6C are diagrams illustrating the principle of a failsafe process for malfunctions according to the second embodiment. As shown in FIG. 6A, in the phase (phase W) having a short-circuit failure, the arm having no failure is turned on. In this case as well, as shown in FIGS. 6B and 6C, the same advantages as those of the first embodiment can be obtained.

FIG. 7 shows a failsafe process for malfunctions according to the present embodiment. This process is repeatedly carried out at a predetermined cycle, for example, by the control apparatus 40. In FIG. 7, those steps which correspond to those shown in FIG. 5 are assigned with the same step numbers for the sake of convenience.

In the series of steps, if a negative determination is made at step S14, control proceeds to step S20 where the part having a short-circuit failure is specified. The specification of the part may be carried out using a known method. Specifically, as shown in FIG. 3B, for example, the absolute value of the current of the phase having a short-circuit failure becomes equal to the sum of the absolute values of the currents of the remaining two phases. In view of this, the phase having a short-circuit failure may be specified, and the arm having the short-circuit failure may be specified based on the magnitude of the current.

Thus, when the step of specifying the part having a short-circuit failure is completed, control proceeds to step S18a. At step S18a, the switching element having no short-circuit failure is turned on in the phase having the short-circuit failure.

[Modifications]

The embodiments described may be modified as follows.

The failsafe performing means is not limited to the one in which both of the high and low-potential-side switching elements Swp and Swn are turned on in one phase and the switching elements Swp and Swn of the remaining phases are all turned off. Alternative to this, the failsafe performing means may be configured such that the high and low-potential-side switching elements Swp and Swn are all turned on in two phases including the phase having a short-circuit failure and both of the switching elements Swp and Swn of the remaining phase are turned off.

Each phase of the inverter IV may have a plurality of serially connected bodies of the high and low-potential-side switching elements Swp and Swn. In this case, both of the high and low-potential-side switching elements Swp and Swn may be turned on in only any one of the serially connected bodies.

The determining means may not necessarily be realized by the excessive current flow protecting function installed in each drive unit DU. Alternative to this, the determining means may be configured by the control apparatus 40 to which the output signals of the current sensors 26 and 28 are inputted.

The connecting/disconnecting circuit for connecting/disconnecting between the DC power supply and the inverter IV is not limited to the one that connects/disconnects between the high-potential-side input terminal and the positive output terminal of the DC power supply. Alternative to this, the connecting/disconnecting circuit may be one that connects/disconnects between the low-potential-side input terminal and the negative output terminal of the DC power supply. Alternatively, the connecting/disconnecting circuit may establish both of the connections/disconnections, i.e. the connection/disconnection between the high-potential-side input terminal and the positive output terminal of the DC power supply, and connection/disconnection between the low-potential-side input terminal and the negative pole of the DC power supply.

The specifying means is not limited to the one exemplified in the above embodiments. Alternatively, the specifying means may have a configuration in which a switching element connecting between one terminal (one phase) of the motor-generator 10 and one pole of the DC power supply is turned on, and the switching element to be turned on is sequentially switched. In the sequential switching of the switching elements in this configuration, a change may occur in which the deviation from a zero point is decreased in the current flowing through the motor-generator 10. Based on this change of the deviation from the zero point, the switching element having a short-circuit failure may be specified. In other words, the occurrence of a short-circuit failure may be specified to a switching element which is directly connected to the switching element being turned on when the change has occurred.

The low-voltage power supply is not limited to the one in which electric energy is supplied only via the DC-DC converter 18. Alternative to this, the electric power outputted from the alternator, which generates electric power using the torque transmitted via the crank shaft of the internal combustion engine 12, may be used as the electric energy of the low-voltage power supply. In this case as well, power consumption is easily reduced during the failsafe process if the failsafe process is of the embodiments of the present invention is used.

The control system may be provided with a switch between the inverter IV and the motor-generator 10. In this case, once the switch is opened, current no longer passes through the inverter IV and thus the switching elements are not required to be turned on. However, when the failsafe performing means of the present invention is used during the time period before the opening of the switch, the merit such as of reducing power consumption may be enjoyed.

The switching elements configuring the DC-AC converting circuit are not limited to IGBTs. Alternative to this, MOS-type field-effect transistors (MOSFETs) may be used as the switching elements. As a matter of course, the switching elements may not necessarily be voltage control type transistors, but may be current control type transistors, such as bipolar transistors. In the case of using the current control type transistors, each transistor is turned on when current is passed through the base of the transistor. Accordingly, depending on the number of switching elements maintained in an on-state in the failsafe process, the limp-home running may be considerably affected. Thus, when the present invention is applied to this case, particularly great advantages may be obtained The rotary electric machine is not limited to the interior permanent magnet synchronous motor (IPMSM). Alternatively, a surface permanent magnet synchronous motor (SPMSM), for example, may be used. It is considered that a resolution principle similar to that of the present invention is applicable to such rotary electric machines at least including permanent magnets.

The hybrid vehicle is not limited to a parallel hybrid vehicle. Alternatively, the vehicle may be a series-hybrid vehicle. Alternatively, the vehicle may be a parallel-series hybrid vehicle. However, in the case where the upper arms are mutually connected and the lower arms are also mutually connected in a plurality of inverters, it is desirable that a limp-home mode is available in the system even when a pair of rotary electric machines are stopped.

Alternatively, the vehicle may be an electric vehicle whose energy form stored for use as an on-vehicle drive source is only electric energy (including a fuel cell that generates electric energy). In this case as well, a limp-home mode will be available. For example, if the electric vehicle includes separate motor-generators for the front and rear wheels, the inverter connected to one of the motor-generators may be shut down and then the failsafe process may be performed. Thus, limp-home running is enabled for the vehicle using the remaining motor-generator.

What is claimed is:

1. A control apparatus for a rotary electric machine equipped with terminals receiving power from a DC power supply having positive and negative output terminals, comprising:
    a DC-AC converting circuit provided with serially connected circuits each having a high-potential-side switching element and a low-potential-side switching element, the high-potential-side and low-potential-side switching elements selectively connecting the terminals of the rotary electric machine to the positive and negative output terminals of the power supply for controlling a controlled variable of the rotary electric machine;
    a connecting/disconnecting circuit arranged to be electrically opened and closed between the DC-AC converting circuit and the power supply to electrically connect and disconnect an electric path connecting both the DC-AC converting circuit and the power supply;
    determining means configured to determine whether or not at least one of the high-potential-side and low-potential-side switching elements have a malfunction which is due to a short-circuit caused in at least one of the turned-on high-potential-side and low-potential-side switching elements; and
    failsafe performing means configured to, as a failsafe operation, electrically open the connecting/disconnecting circuit and turn on both the high-potential-side and low-potential-side switching elements residing in a part of the serially connected circuits when it is determined by the determining means that the at least one of the high-potential-side and low-potential-side switching elements have the malfunction such that the turned-on high-potential-side and low-potential-side switching elements realize a short-circuit state therein,
    wherein the determining means is configured to:
        check that a current passing through any of the switching elements is over a previously set threshold,
        turn all the switching elements off when it is checked that the current is over the threshold,
        check whether or not a center of amplitude of current passing through the rotary electric machine is deviated from a current of zero by a given amount of current, and
        decide that the at least one of the high-potential-side and low-potential-side switching elements has the malfunction when it is checked that the center of amplitude of current passing through the rotary electric machine is deviated from the current of zero and that the at least one of the high-potential-side and low-potential-side switching elements does not have the malfunction when it is checked that the center of amplitude of current passing through the rotary electric machine is not deviated from the current of zero.

2. The control apparatus of claim 1, comprising estimating means configured to estimate, among the switching elements, a switching element which has caused the malfunction therein,
    wherein the failsafe performing means includes means for turning on a switching element electrically connected in series to the switching element estimated by the estimating means.

3. The control apparatus of claim 1, wherein the failsafe performing means includes means for turning on both the high-potential-side and low-potential-side switching elements which compose only one of the serially connected circuits, the one serially connected circuit being short-circuited.

4. The control apparatus of claim 1, wherein
    the rotary electric machine is mounted on a vehicle provided with the rotary electric machine, which serves as a first main machine, a low-voltage power supply, which serves as a second main machine, whose output voltage is lower than output voltage of the DC power supply, and a step-down converter configured to step down the output voltage of the DC power supply and supplies the step-down voltage to the low-voltage power supply, the switching elements of the DC-AC converting circuit being turned on and off based on power from the low-voltage power supply and the main machine being controlled based on the power from the low-voltage power supply; and
    the step-down converter is electrically connected to the DC power supply via the connecting/disconnecting circuit.

5. The control apparatus of claim 1, comprising control start means for starting control of rotational operations of the rotary electric machine by causing the connecting/disconnecting circuit to be electrically closed.

6. The control apparatus of claim 2, wherein the failsafe performing means includes means for turning on both the high-potential-side and low-potential-side switching elements which compose only one of the serially connected circuits, the one serially connected circuit being short-circuited.

7. The control apparatus of claim 3, wherein
    the rotary electric machine is mounted on a vehicle provided with the rotary electric machine, which serves as a first main machine, a low-voltage power supply, which serves as a second main machine, whose output voltage is lower than output voltage of the DC power supply, and a step-down converter configured to step down the output voltage of the DC power supply and supplies the step-down voltage to the low-voltage power supply, the switching elements of the DC-AC converting circuit being turned on and off based on power from the low-voltage power supply and the main machine being controlled based on the power from the low-voltage power supply; and
    the step-down converter is electrically connected to the DC power supply via the connecting/disconnecting circuit.

8. The control apparatus of claim 6, wherein
    the rotary electric machine is mounted on a vehicle provided with the rotary electric machine, a main machine, a low-voltage power supply whose output voltage is lower than output voltage of the DC power supply, and a step-down converter configured to step down the output voltage of the DC power supply and supplies the step-down voltage to the low-voltage power supply, the switching elements of the DC-AC converting circuit being turned on and off based on power from the low-voltage power supply and the main machine being controlled based on the power from the low-voltage power supply; and the step-down converter is electrically connected to the DC power supply via the connecting/disconnecting circuit.

9. The control apparatus of claim 8, wherein the failsafe performing means is configured to perform the failsafe operation during a period of time from a time instant at which the determining means determines that there occurred the malfunction to a time instant at which the vehicle stops from running.

10. The control apparatus of claim 8 comprising control start means for starting control of rotational operations of the rotary electric machine by causing the connecting/disconnecting circuit to be electrically closed.

11. The control apparatus of claim 8, wherein the failsafe performing means is configured to perform the failsafe operation during a period of time from a time instant at which the determining means determines that there occurred the malfunction to a time instant at which the vehicle stops from running.

12. The control apparatus of claim 7, comprising control start means for starting control of rotational operations of the rotary electric machine by causing the connecting/disconnecting circuit to be electrically closed.

13. The control apparatus of claim 7, wherein the failsafe performing means is configured to perform the failsafe operation during a period of time from a time instant at which the determining means determines that there occurred the malfunction to a time instant at which the vehicle stops from running.

* * * * *